United States Patent
Seyama et al.

(10) Patent No.: US 10,028,214 B2
(45) Date of Patent: Jul. 17, 2018

(54) BASE STATION AND CELL SELECTION METHOD

(71) Applicant: FUJITSU LIMITED, Kawasaki-shi, Kanagawa (JP)

(72) Inventors: Takashi Seyama, Kawasaki (JP); Teppei Oyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 14/847,082

(22) Filed: Sep. 8, 2015

(65) Prior Publication Data

US 2016/0127987 A1 May 5, 2016

(30) Foreign Application Priority Data

Oct. 29, 2014 (JP) .................................. 2014-220531

(51) Int. Cl.
*H04W 48/20* (2009.01)
*H04W 72/04* (2009.01)
(Continued)

(52) U.S. Cl.
CPC ............ *H04W 48/20* (2013.01); *H04B 7/024* (2013.01); *H04W 72/0486* (2013.01); *H04W 88/085* (2013.01)

(58) Field of Classification Search
None
See application file for complete search history.

(56) References Cited

U.S. PATENT DOCUMENTS

| 8,543,150 B2* | 9/2013 | Choi ................. H04B 7/024 370/252 |
| 2010/0291936 A1* | 11/2010 | Zangi ................. H04B 7/024 455/450 |

(Continued)

FOREIGN PATENT DOCUMENTS

| JP | 2011-142375 | 7/2011 |
| JP | 2014-127961 | 7/2014 |
| WO | 2014/020781 A1 | 2/2014 |

OTHER PUBLICATIONS

Emmanouil Pateromichelakis et al., "On the Evolution of Multi-Cell Scheduling in 3GPP LTE / LTE-A," IEEE Communications Surveys & Tutorials, vol. 15, No. 2, Second Quarter 2013, pp. 701-717, (17 pages).

(Continued)

*Primary Examiner* — Candal Elpenord
(74) *Attorney, Agent, or Firm* — Fujitsu Patent Center

(57) ABSTRACT

A base station includes a receiving unit that receives a report of a reception power from a user equipment, and a selecting unit that calculates a first throughput and a second throughput by using the reception power, the first throughput being a throughput when coordinated communication is not performed and a single user equipment occupies an entire band, the second throughput being a throughput when the coordinated communication is performed and the single user equipment occupies the entire band, and selects a coordination candidate cell based on the first throughput, the second throughput, a first resource allocation rate and a second resource allocation rate, the first resource allocation rate being a resource allocation rate when the coordinated communication is not performed, the second resource allocation rate being a resource allocation rate when the coordinated communication is performed.

6 Claims, 10 Drawing Sheets

(51) Int. Cl.
*H04B 7/024* (2017.01)
*H04W 88/08* (2009.01)

(56) References Cited

U.S. PATENT DOCUMENTS

| | | | | |
|---|---|---|---|---|
| 2011/0237272 A1* | 9/2011 | Gorokhov | .............. | H04B 7/024 455/452.1 |
| 2011/0281585 A1* | 11/2011 | Kwon | ................... | H04L 1/0002 455/436 |
| 2012/0028665 A1* | 2/2012 | Kwon | ................... | H04L 1/0002 455/501 |
| 2012/0044870 A1* | 2/2012 | Mochizuki | ............. | H04B 7/024 370/328 |
| 2013/0044602 A1* | 2/2013 | Xiao | ...................... | H04B 7/024 370/237 |
| 2015/0018034 A1* | 1/2015 | Nagata | ................. | H04B 7/0626 455/524 |
| 2015/0146664 A1 | 5/2015 | Kobayashi et al. | | |

OTHER PUBLICATIONS

Samsung, "Performance evaluation of CoMP JT for Scenario 2", 3GPP TSG RAN WG1 Meeting #65, Barcelona, Spain, May 9-13, 2011, pp. 1-7, R1-111464, URL: http://www.3gpp.org/ftp/tsg_ran/WG1_RL1/TSGR1_65/Docs/R1-111464.zip.

Texas Instruments, "On signaling for CoMP with non-ideal backhaul", 3GPP TSG-RAN WG1#76bis, Shenzhen, China, May 22, 2014, R1-141605,URL: http://www.3gpp.org/ftp/tsg_ran/WG1_RL1/TSGR1_76b/Docs/R1-141605.zip.

JPOA—Japanese Office Action dated May 8, 2018 for Japanese Patent Application No. 2014-220531, with English translation.

\* cited by examiner

BASE STATION AND CELL SELECTION METHOD

CROSS-REFERENCE TO RELATED APPLICATION

This application is based upon and claims the benefit of priority of the prior Japanese Patent Application No. 2014-220531, filed on Oct. 29, 2014, the entire contents of which are incorporated herein by reference.

FIELD

The embodiments discussed herein are related to a base station and a cell selection method.

BACKGROUND

In the third generation partnership project long term evolution (3GPP LTE), as a technique to improve the communication quality of user equipment (UE) positioned at a cell edge, the "coordinated communication" by multiple cells has been considered. The coordinated communication is a technique of communicating with user equipment with multiple cells coordinating with each other. The coordinated communication in the 3GPP LTE is called "coordinated multi-point (CoMP)" communication (Emmanouil Pateromichelakis, Mehrdad Shariat, Atta ul Quddus, and Rahim Tafazolli, "On the Evolution of Multi-Cell Scheduling in 3GPP LTE/LTE-A", *IEEE Commun. Surv. & Tut.*, pp. 1-17, in press).

As downlink coordinated communication, for example, there is a "joint transmission (JT)" in which the same data is transmitted to a single user equipment from multiple transmission points each of which forms multiple cells. The transmission point is, for example, a base station, a remote radio head (RRH), or the like. Because gain improvement by the space diversity effect is achieved by performing this downlink coordinated communication, the reception quality is improved at user equipment positioned at a cell edge.

If all of cells around the user equipment are handled as candidate cells for the coordinated communication (hereinafter, "coordination candidate cells" in some cases), the processing amount at the base station, and the amount of signals communicated between the base station and the user equipment increase when determining a cell that actually performs the coordinated communication (hereinafter, "coordination cell" in some cases) from among the coordination candidate cells.

Specifically, for example, the base station allocates communication resources (that is, scheduling) to the user equipment based on a scheduling metric by 1 millisecond (ms) sub-frame unit, to determine a coordination cell per sub-frame. At this time, if all of the cells around the user equipment are determined as the coordination cells, the number of patterns of combinations of the coordination candidate cells is to be enormous, and the amount of calculation in the scheduling metric is to be enormous.

Moreover, when determining a coordination cell from among the coordination candidate cells, a reference signal (RS) for reception quality measurement by the user equipment is transmitted at all of the coordination candidate cells. The user equipment informs about the reception quality to all of the coordination candidate cells. Therefore, if all of the cells around the user equipment are determined as the coordination candidate cells, the overhead of the reference signal increases in the downlink, and the signaling overhead in informing the reception quality increases in the uplink.

Accordingly, a small number of cells are selected as the coordination candidate cells in advance. As a method of selecting a coordination candidate cell, there is a method that uses a reception power (reference signal received power (RSRP)) of a reference signal that is transmitted to user equipment at each cell. For example, among cells other than a serving cell, a cell having a difference in RSRP from RSRP of the serving cell that is equal to or smaller than a threshold is selected as a coordination candidate cell of the serving cell. The "serving cell" is, for user equipment, a cell in which the user equipment is positioned, that is, a cell in which the user equipment is currently registered.

Furthermore, selection of a coordination candidate cell is also called CoMP set setting, coordination area setting, or clustering.

Examples of related-art are described in Emmanouil Pateromichelakis, Mehrdad Shariat, Atta ul Quddus, and Rahim Tafazolli, "On the Evolution of Multi-Cell Scheduling in 3GPP LTE/LTE-A," IEEE Commun. Surv. & Tut., pp. 1-17, in press.

As described above, when a coordination candidate cell is selected based on a difference in RSRP and a threshold, a coordination candidate cell to be selected is dependent on the threshold, and therefore, it is important to set an optimal threshold. However, because an optimal threshold is dependent on a cell configuration, a type of coordinated communications, and the like, it is difficult to determine an optimal threshold uniquely. Moreover, a too large threshold results in the excessive number of coordination candidate cells, and the processing amount at a base station, and the amount of signals communicated between the base station and user equipment increase as described above. On the other hand, a too small threshold results in the excessively small number of coordination candidate cells, and the gain of the coordinated communication decreases. As for the types of downlink coordinated communications, for example, there are a coherent JT, a non-coherent JT, a dynamic point selection (DPS), muting, and the like.

Because it is difficult to determine an optimal threshold uniquely in a selection method of selecting a coordination candidate cell based on a difference in RSRP and a threshold, a selected coordination candidate cell is not necessarily the optimal one.

SUMMARY

According to an aspect of an embodiment, a base station in a communication system, in which a plurality of cells are capable of performing communication in coordination with each other, includes a receiving unit that receives a report of a reception power from a user equipment, and a selecting unit that calculates a first throughput and a second throughput by using the reception power, the first throughput being a throughput when coordinated communication is not performed and a single user equipment occupies an entire band, the second throughput being a throughput when the coordinated communication is performed and the single user equipment occupies the entire band, and selects a coordination candidate cell based on the first throughput, the second throughput, a first resource allocation rate and a second resource allocation rate, the first resource allocation rate being a resource allocation rate when the coordinated communication is not performed, the second resource allocation rate being a resource allocation rate when the coordinated communication is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The base station and the cell selection method disclosed in the present application are not limited to these embodiments. Moreover, the same reference symbols are given to components having the identical functions and to steps at which the identical processing is performed in respective embodiments, and duplicated explanation is omitted.

[a] First Embodiment

Configuration of Communication System

Figure 1:
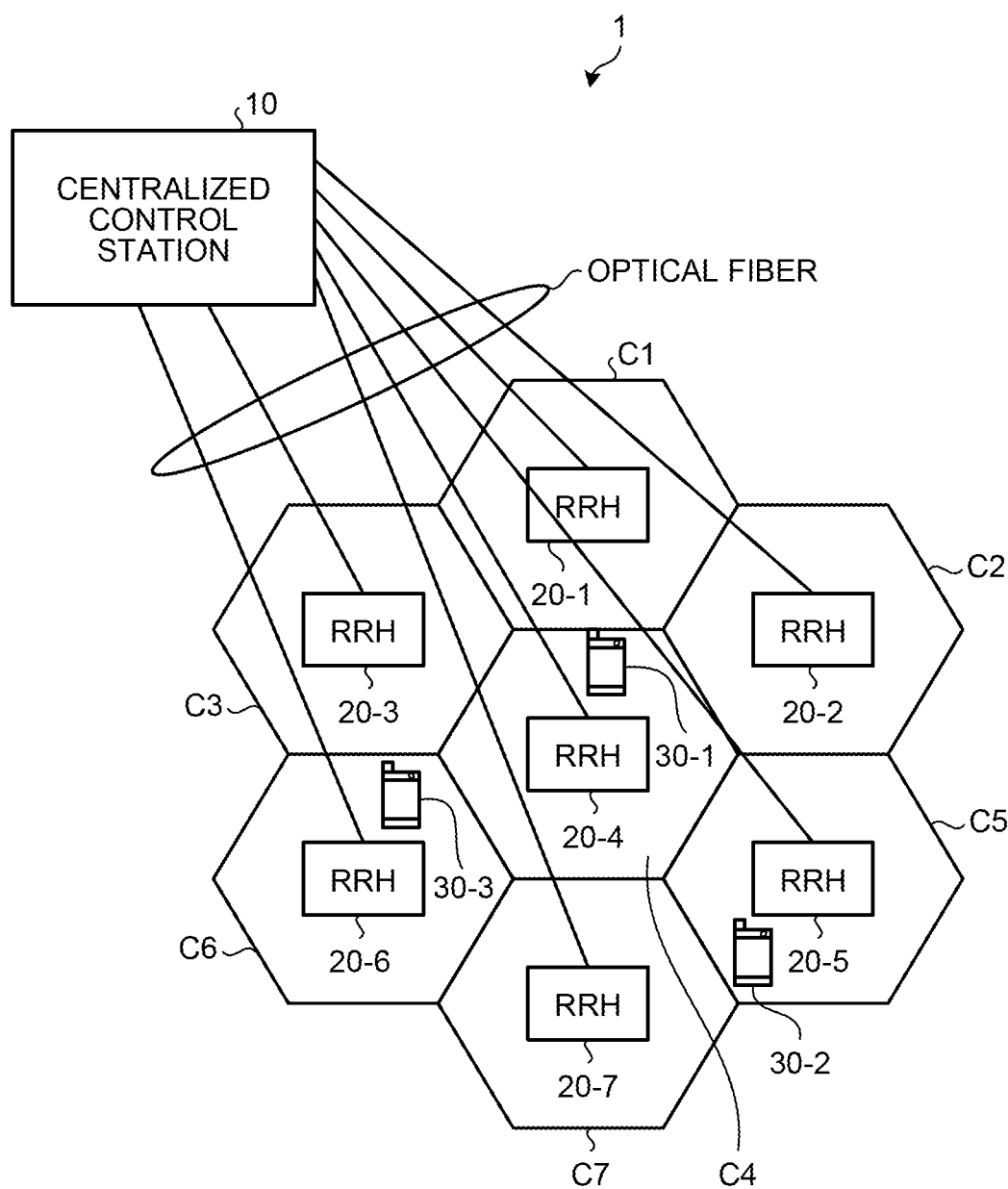
FIG. 1 depicts one example of a configuration of a communication system of a first embodiment.

FIG. 1 depicts one example of a configuration of a communication system of a first embodiment. As depicted in FIG. 1, a communication system 1 includes a centralized control station 10, RRHs 20-1 to 20-7, and user equipment 30-1 to 30-3.

The centralized control station 10 and the RRHs 20-1 to 20-7 are connected through optical fibers, and the centralized control station 10 and the RRHs 20-1 to 20-7 are equipped in a base station described later. The RRH 20-1 to 20-7 form cells C1 to C7, respectively. For example, the RRH 20-1 forms the cell C1.

The user equipment 30-1 is positioned in the cell C4, and the cell C4 is the serving cell for the user equipment 30-1. The user equipment 30-2 is positioned in the cell C5, and the cell C5 is the serving cell for the user equipment 30-2. The user equipment 30-3 is positioned in the cell C6, and the cell C6 is the serving cell for the user equipment 30-3.

For example, under control of the centralized control station 10, to the user equipment 30-1, the cell C4, which is the serving cell thereof, and either one of the cells C1 to C3, and C5 to C7 except the cell C4 can perform transmission in coordination with each other. That is, the communication system 1 is capable of performing communication with multiple cells in coordination with each other.

Although seven RRHs and three units of user equipment are used as an example in FIG. 1, the number of RRHs and the number of use equipment are not limited to the ones depicted in FIG. 1. Hereinafter, the RRHs 20-1 to 20-7 may be collectively called RRH 20 when not distinguished from each other, and the user equipment 30-1 to 30-3 may be collectively called user equipment 30 when not distinguished from each other.

Configuration of Base Station

Figure 2:
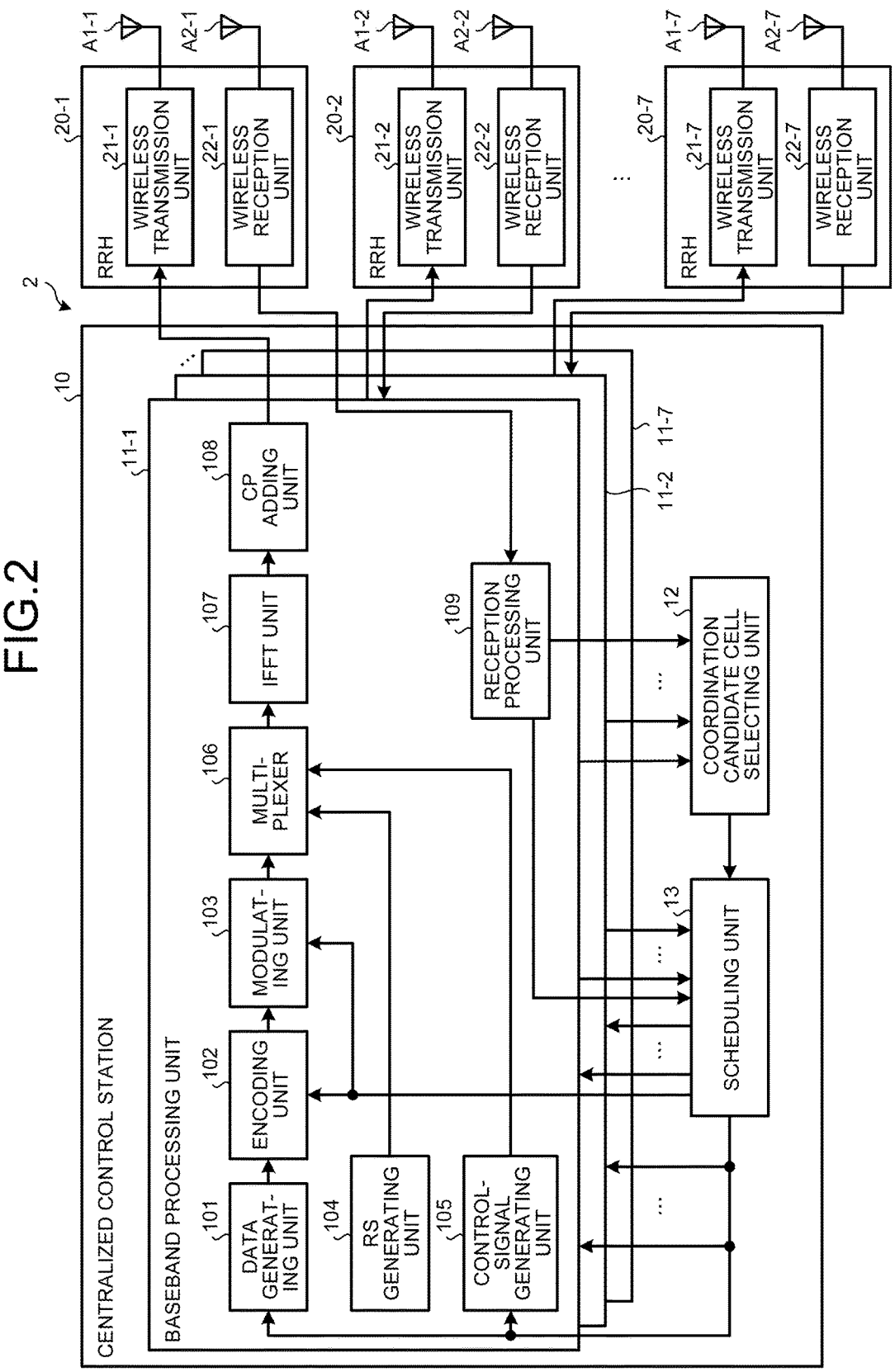
FIG. 2 is a functional block diagram indicating one example of a configuration of a base station of the first embodiment.
Figure 3:
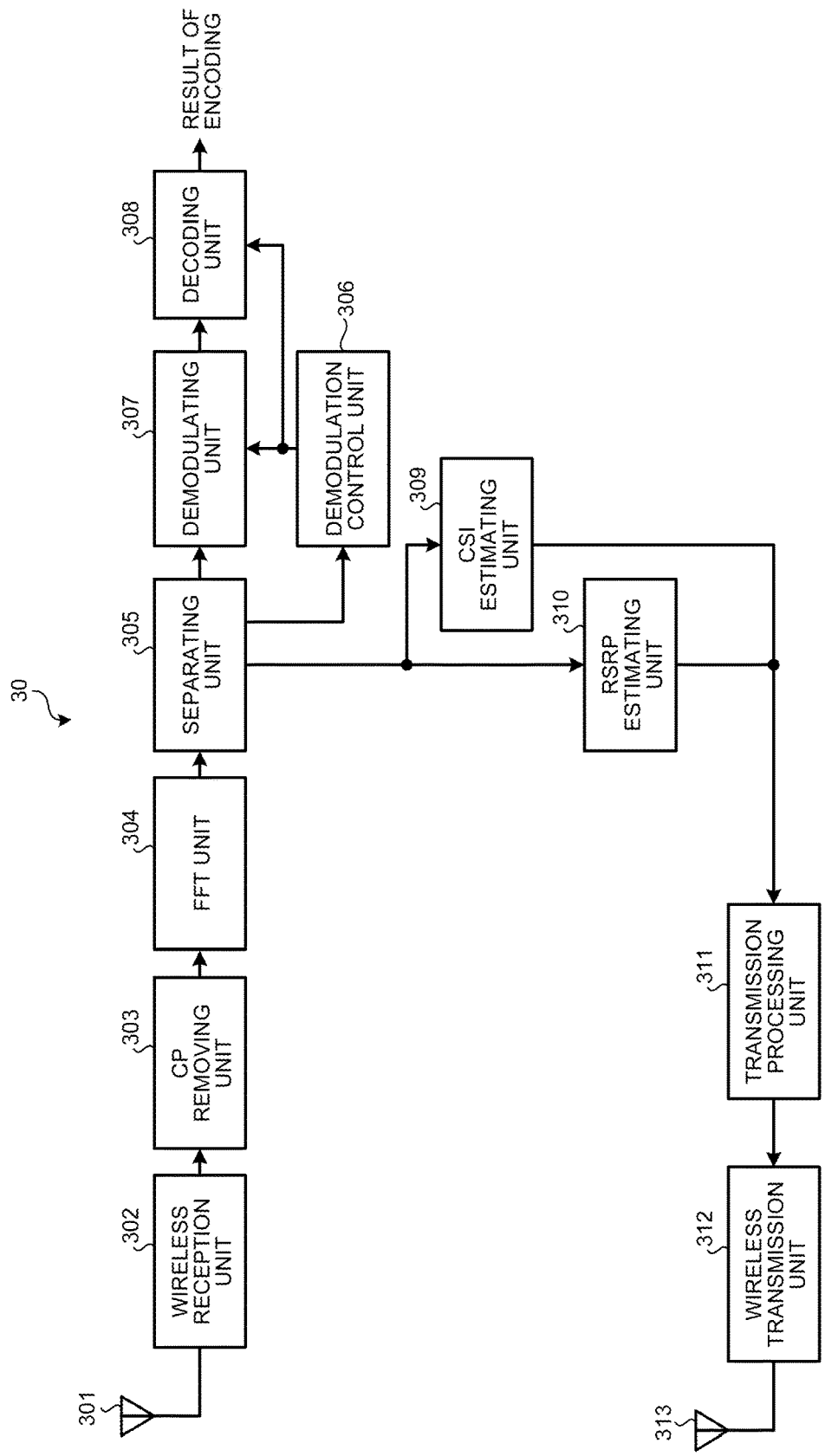
FIG. 3 is a functional block diagram indicating one example of a configuration of user equipment of the first embodiment.

FIG. 3 is a functional block diagram indicating one example of a configuration of a base station of a first embodiment. As depicted in FIG. 2, a base station 2 includes the centralized control station 10, and the RRHs 20-1 to 20-7.

The centralized control station 10 includes baseband processing units 11-1 to 11-7, a coordination candidate cell selecting unit 12, and a scheduling unit 13. The baseband processing units 11-1 to 11-7 correspond to the RRHs 20-1 to 20-7, respectively, and perform baseband processing of each cell of the cells C1 to C7. The baseband processing units 11-1 to 11-7 are connected to the RRHs 20-1 to 20-7, respectively, through optical fibers. For example, the baseband processing unit 11-1 is connected to the RRH 20-1 through an optical fiber. Hereinafter, the baseband processing units 11-1 to 11-7 may be called collectively when not distinguished from each other.

A baseband processing unit 11 includes a data generating unit 101, an encoding unit 102, a modulating unit 103, an RS generating unit 104, a control-signal generating unit 105, and a multiplexer 106. Furthermore, the baseband processing unit 11 includes an inverse fast-Fourier-transform (IFFT) unit 107, a cyclic-prefix (CP) adding unit 108, and a reception processing unit 109. The baseband processing units 11-1 to 11-7 have the identical configuration to each other.

The RRH 20-1 includes a wireless transmission unit 21-1, a wireless reception unit 22-1, a transmission antenna A1-1, and a reception antenna A2-1. The RRH 20-2 includes a wireless transmission unit 21-2, a wireless reception unit 22-2, a transmission antenna A1-2, and a reception antenna A2-2. Moreover, the RRH 20-7 includes a wireless transmission unit 21-7, a wireless reception unit 22-7, a transmission antenna A1-7, and a reception antenna A2-7. That is, the RRHs 20-1 to 20-7 have the identical configuration to each other, and perform wireless processing of each cell of the cells C1 to C7. Hereinafter, the wireless transmission units 21-1 to 21-7 may be collectively called wireless transmission unit 21 when not distinguished from each other, and the wireless reception units 22-1 to 22-7 may be collectively called wireless reception unit 22 when not distinguished from each other. Furthermore, the transmission antenna A1-1 to A1-7 may be collectively called transmission antenna A1 when not distinguished from each other, and the reception antennas A2-1 to A2-7 may be collectively called reception antenna A2 when not distinguished from each other.

The wireless reception unit 22 receives an uplink signal from the user equipment 30 through the reception antenna A2, and outputs, to the reception processing unit 109, a baseband signal that is obtained by performing wireless reception processing such as down conversion and analog/digital conversion on the received uplink signal. In the uplink signal received by the wireless reception unit 22, an RSRP of the downlink and channel state information (CSI) of the downlink informed by user equipment are included.

The reception processing unit 109 demodulates and decodes the baseband signal that is input from the wireless reception unit 22, to acquire the RSRP of the downlink and the CSI of the downlink. The reception processing unit 109 outputs the RSRP to the coordination candidate cell selecting unit 12, and outputs the CSI to the scheduling unit 13.

The coordination candidate cell selecting unit 12 selects a coordination candidate cell for each of the user equipment 30 by using the RSRP that is informed by the user equipment 30. When a sub-frame is in a short period of 1 ms, the coordination candidate cell selecting unit 12 selects a coordination candidate cell in a long period of several hundred ms intervals, for example. Details of the selection processing of a coordination candidate cell are described later. The coordination candidate cell selecting unit 12 outputs a result of selection of a coordination candidate cell to the scheduling unit 13.

The scheduling unit 13 determines the user equipment 30 to which a communication resource (hereinafter, simply "resource" in some cases) is to be allocated, and a modulation and coding scheme (MCS) based on the CSI. Furthermore, the scheduling unit 13 determines a coordination cell from among the coordination candidate cells, for the user equipment 30 to which the resource is allocated. Determination of a coordination cell is performed, for example, based on a proportional fairness (PF) metric.

That is, the scheduling unit 13 calculates, per user equipment 30, a PF metric for each of a case in which transmission is performed only from the serving cell, and a case in which transmission is performed by the coordination candidate cell selected by the coordination candidate cell selecting unit 12 and the serving cell in coordination with each other. The scheduling unit 13 then determines a cell that is included in a combination of cells in which the PF metric is maximum as a coordination cell. The scheduling unit 13 outputs the determined MCS to the encoding unit 102, the modulating unit 103, and the control-signal generating unit 105, according to the determined coordination cell. For example, when the cell C1 is the serving cell, and the cell C2 is the coordination cell, the scheduling unit 13 outputs a result of scheduling and the MCS to the baseband processing unit 11-1 and 11-2.

The data generating unit 101 generates user data for the user equipment 30 to which a resource has been allocated, according to a result of scheduling input from the scheduling unit 13, and outputs the generated user data to the encoding unit 102.

The encoding unit 102 encodes the user data according to the MCS input from the scheduling unit 13, and the modulating unit 103 modulates the encoded user data and outputs a modulated data signal to the multiplexer 106.

The RS generating unit 104 generates a reference signal to output to the multiplexer 106.

The control-signal generating unit 105 generates a control signal indicating the MCS and the result of scheduling, modulates the generated control signal, and outputs the modulated control signal to the multiplexer 106.

The multiplexer 106 multiplexes the data signal, the reference signal, and the control signal to output to the IFFT unit 107.

The IFFT unit 107 performs IFFT on the multiplexed data signal, reference signal, and control signal to generate a valid symbol, and outputs the generated valid symbol to the CP adding unit 108.

The CP adding unit 108 generates an orthogonal-frequency-division multiplexing (OFDM) symbol by adding a CP to the valid symbol, and outputs the generated OFDM symbol to the wireless transmission unit 21.

The wireless transmission unit 21 transmits a downlink signal that is acquired by performing wireless transmission processing such as digital/analog conversion and upconversion, on the OFDM symbol, to the user equipment 30 through the transmission antenna A1.

Configuration of User Equipment

FIG. 3 is a functional block diagram indicating one example of a configuration of the user equipment of the first embodiment. As depicted in FIG. 3, the user equipment 30 includes a reception antenna 301, a wireless reception unit 302, a CP removing unit 303, an FFT unit 304, a separating unit 305, a demodulation control unit 306, a demodulating unit 307, and a decoding unit 308. Furthermore, the user equipment 30 includes a CSI estimating unit 309, an RSRP estimating unit 310, a transmission processing unit 311, a wireless transmission unit 312, and a transmission antenna 313.

The wireless reception unit 302 receives the downlink signal that is transmitted from the base station 2 through the reception antenna 301, and outputs an OFDM symbol that is acquired by performing wireless reception processing such as down conversion and analog/digital conversion on the received downlink signal, to the CP removing unit 303.

The CP removing unit 303 acquires the valid symbol by removing the CP from the OFDM symbol to output to the FFT unit 304.

The FFT unit 304 acquires the data signal, the reference signal, and the control signal by performing FFT on the valid symbol, to output to the separating unit 305.

The separating unit 305 separates the signal input from the FFT unit 304 into the data signal, the reference signal, and the control signal, and outputs the data signal to the demodulating unit 307, outputs the control signal to the demodulation control unit 306, and outputs the reference signal to the CSI estimating unit 309 and the RSRP estimating unit 310.

The demodulation control unit 306 demodulates the control signal that is input from the separating unit 305, and specified the MCS and the result of scheduling indicated in the control signal to the demodulating unit 307. Moreover, the demodulation control unit 306 specifies the MCS indicated in the control signal to the decoding unit 308.

The demodulating unit 307 demodulates the data signal that is input from the separating unit 305 according to the MCS and the result of scheduling specified by the demodulation control unit 306, and outputs a result of demodulation to the decoding unit 308.

The decoding unit 308 decodes the result of demodulation according to the MCS specified by the demodulation control unit 306, to acquire a result of decoding.

The CSI estimating unit 309 estimates a CSI of the downlink by using the reference signal input from the separating unit 305, and outputs an informing signal that indicates the estimated CSI to the transmission processing unit 311.

The RSRP estimating unit 310 estimates an RSRP of the downlink by using the reference signal that is input from the separating unit 305, and outputs an informing signal that indicates the estimated RSRP to the transmission processing unit 311.

The transmission processing unit 311 encodes and modulates the informing signals that are input from the CSI estimating unit 309 and the RSRP estimating unit 310, and outputs the modulated informing signal to the wireless transmission unit 312.

The wireless transmission unit 312 transmits an uplink signal that is acquired by performing wireless reception processing such as digital/analog conversion and upconversion on the informing signal input from the transmission processing unit 311, to the base station 2 through the transmission antenna 313.

Selection Processing of Coordination Candidate Cell

Details of the selection processing of a coordination candidate cell are explained below.

A throughput of each user equipment n when a data signal is received only from a serving cell (that is, when the coordinated communication is not being executed), and when a signal unit of the user equipment n occupies the entire band is calculated. Hereinafter, the throughput when a single user equipment occupies the entire band may be called "expected throughput". When the serving cell of the user equipment n is expressed as x(n), an expected throughput $R_{n, x(n)}$ when the coordinated communication is not performed is expressed by Equation (1). The user equipment n is, for example, either one of the user equipment 30-1 to 30-3 in FIG. 1. Moreover, the serving cell x(n) is, for example, either one of the cells C1 to C7 in FIG. 1. For example, the serving cell of the user equipment 30-1 is to be the cell C4, and the serving cell of the user equipment 30-2 is to be the cell C5, and the serving cell of the user equipment 30-3 is to be the cell C6. Note that $P_{n, i}$ in Equation (1) is an RSRP of a cell$_i$ informed from the user equipment n, M is a set of cells formed by the base station 2, $N_{th}$ is an interference noise power that includes an interference to the user equipment n and a thermal noise of the user equipment n. Moreover, W is a bandwidth of a data signal, and α is a coefficient expressing deterioration from the Shannon's theorem. As α, for example, 2.0 is set.

$$R_{n,x(n)} = W \log\left(1 + \frac{SNR_{n,x(n)}}{\alpha}\right) \tag{1}$$

$$SNR_{n,x(n)} = \frac{P_{n,x(n)}}{N_{th} + \sum_{i \in M, i \neq x(n)} P_{n,i}}$$

Moreover, a throughput when each cell except the serving cell is determined as the coordination candidate cell (that is, when the coordinated communication is performed), and when a single unit of the user equipment n occupies the entire band is calculated for each of the user equipment n. An expected throughput $R_{n, x(n), l}$ when a data signal is transmitted with the cell l (where l≠x(n)) as the coordination candidate cell to the user equipment n the serving cell of which is the cell x(n) is expressed by Equation (2). Note that muting is the coordinated communication in which the cell l stops transmission. The non-coherent JT is JT in which phase adjustment such as precoding is not performed among cells. The coherent JT is JT in which the phase adjustment such as precoding is performed among cells.

$$R_{n,x(n),l} = W \log\left(1 + \frac{SNR_{n,x(n),l}}{\alpha}\right) \tag{2}$$

$$SNR_{n,x(n),l} = \frac{P_{n,x(n)}}{N_{th} + \sum_{i \in M, i \neq x(n), l} P_{n,i}} : \text{muting}$$

$$SNR_{n,x(n),l} = \frac{P_{n,x(n)} + P_{n,l}}{N_{th} + \sum_{i \in M, i \neq x(n), l} P_{n,i}} : \text{non-coherent} JT$$

$$SNR_{n,x(n),l} = \frac{\left(\sqrt{P_{n,x(n)}} + \sqrt{P_{n,l}}\right)^2}{N_{th} + \sum_{i \in M, i \neq x(n), l} P_{n,i}} : \text{coherent} JT$$

An allocation rate of resources (hereinafter, "resource allocation rate" in some cases) to the user equipment n in each cell is defined as follows. That is, for the user equipment n the serving cell of which is the cell x(n), a resource allocation rate from the serving cell is $p_{n, x(n)}$. Moreover, a resource rate (hereinafter, "CoMP rate" in some cases) for which the coordinated communication is performed with the serving cell and a cell l (that is, a cell other than the serving cell) is $\rho_{n, x(n), l}$ (where, $0 \leq \rho_{n, x(n), l} \leq 1$). Therefore a throughput $T_{n, x(n), l}$ (hereinafter "estimated throughput" in some cases) that is estimated for the user equipment n is expressed by Equation (3). In Equation (3), "$1 - \rho_{n, x(n), l}$" indicates a rate of resources in which a data signal is received only from the serving cell among the resources allocated by the serving cell, that is, a rate of resources in which the coordinated communication is not performed (hereinafter, "non-CoMP rate" in some cases) for the user equipment n. Therefore, "$p_{n, x(n), l} (1 - \rho_{n, x(n), l})$" corresponds to the resource allocation rate when the coordinated communication is not performed, and "$p_{n, x(n)} \rho_{n, x(n), l}$" corresponds to the resource allocation rate when the coordinated communication is performed.

$$T_{n,x(n),l} = p_{n,x(n)}\{(1 - \rho_{n,x(n),l})R_{n,x(n)} + \rho_{n,x(n),l}R_{n,x(n),l}\} \tag{3}$$

In Equation (3) if $\rho_{n, x(n), l} = 0$ it is an estimated throughput when a data signal is transmitted only from the serving cell, that is when the coordinated communication is not performed. If $\rho_{n, x(n), l} = 0$ in Equation (3), it is an estimated throughput when the coordinated communication with the serving cell and the cell l is performed for all of the resources.

Therefore, an increase rate of an estimated throughput when the coordinated communication is performed relative to a case in which the coordinated communication is not performed is expressed by Equation (4).

$$\frac{p_{n,x(n)}\{(1 - \rho_{n,x(n),l})R_{n,x(n)} + \rho_{n,x(n),l}R_{n,x(n),l}\}}{p_{n,x(n)}R_{n,x(n)}} = \left\{(1 - \rho_{n,x(n),l}) + \rho_{n,x(n),l}\frac{R_{n,x(n),l}}{R_{n,x(n)}}\right\} \tag{4}$$

Because the resource of each cell is limited, a constraint expressed by Equation (5) is set. N expresses a set of all of the user equipment n. The first term of the left side of Equation (5) indicates a total of resources allocated to the user equipment n the serving cell of which is a cell m, and the second term of the left side indicates a total of resources that are taken by the user equipment n for which the cell m is a coordination candidate cell.

$$\sum_{n \in N, x(n) = m} p_{n,x(n)} + \sum_{n \in N, x(n) \neq m, y(n) = m} p_{n,x(n)} \rho_{n,x(n),y(n)} = 1, m \notin M \tag{5}$$

Furthermore, it is assumed that remaining resources after subtracting the total resources taken by the user equipment n for which the cell m is a coordination candidate cell from the entire resources is equally divided among user equipment the serving cell of which is the cell m. That is, it is assumed as in Equation (6).

$$p_{n,m} = p_m \tag{6}$$

If assumed as in Equation (6), Equation (7) is established. $K_m$ indicates the total number of user equipment the serving cell is m, and for example, the total number of the user equipment 30 in the example depicted in FIG. 1 is "3".

$$K_m p_m + \sum_{n \in N, x(n) \neq m, y(n) = m} p_{x(n)} \rho_{n,x(n),y(n)} = 1, m \in M \tag{7}$$

Therefore, $P_m$ in Equation (7) is a solution of simultaneous equations indicated by Equation (8).

$$Ap = 1 \tag{8}$$

A in Equation (8) is a matrix of $|M| \times |M|$, and constituents thereof are expressed by Equation (9). $|M|$ is a cardinal number of the set M, that is, it expresses the total number of cell, and for example, the total number of cells in the example depicted in FIG. 1 is "7". In Equation (9), z(j) indicates an equipment number of user equipment for which a cell j is a coordinated candidate cell.

$$A_{ii} = K_i \tag{9}$$
$$A_{ij} = \sum_{z(j)} \rho_{z(j),i,j}, \; i \neq j$$

Furthermore, p in Equation (8) indicates a vector of $|M| \times 1$ as indicated in Equation (10). T in Equation (10) indicates transpose of matrix.

$$P = [p_1 p_2 \ldots p_{|M|}]^T \tag{10}$$

Furthermore, 1 in Equation (8) is a vector indicated in Equation (11), that is, a vector of $|M| \times 1$ in which all of factors are 1. T in Equation (11) indicates transpose of matrix.

$$1 = [1 \; 1 \; \ldots \; 1]^T \tag{11}$$

When assuming that the cell l is the coordination candidate cell for the user equipment n the serving cell of which is the cell x(n), a throughput of user equipment z(l) the serving cell of which is the cell l decreases because the resource of the cell l is taken away. As a result of the resource of the cell l being taken away, the resource of the cell l decreases from $K_1 p_1$ to what is expressed by Equation (12).

$$K_l p_l - p_{x(n)} \rho_{n,x(n),l} \tag{12}$$

Therefore, a decrease rate of an estimated throughput when the coordinated communication is performed is expressed by Equation (13).

$$\frac{K_l p_l - p_{x(n)} \rho_{n,x(n),l}}{K_l p_l} \tag{13}$$

A PF utility is expressed by a logarithm sum of throughputs of the respective user equipment n. Therefore, an increase-decrease rate $g_{n, x(n), l}$ is expressed by a product of the increase rate of an estimated throughput of each of the user equipment n (Equation (4)) and the decrease rate of an estimated throughput of each of the user equipment n (Equation (13)). The reason why the second term of the right side of Equation (14) is exponentiated by $K_l$ is because the number of user equipment that uses the cell l as the serving cell is $K_l$.

$$g_{n,x(n),l} = \left\{(1 - \rho_{n,x(n),l}) + \rho_{n,x(n),l} \frac{R_{n,x(n),l}}{R_{n,x(n)}}\right\} \left(\frac{K_l p_l - p_{x(n)} \rho_{n,x(n),l}}{K_l p_l}\right)^{K_l} \tag{14}$$

Therefore, if the condition of Equation (15) is satisfied, the PF utility can be increased.

$$g_{n,x(n),l} > 1 \tag{15}$$

Equation (14) is dependent on the CoMP rate, and the CoMP rate $\rho_{tmp, n, x(n), l}$ the increase-decrease rate $g_{n, x(n), l}$ is given by Equation (16) and Equation (17).

$$\rho_{tmp,n,x(n),l} = \frac{\Phi_{n,x(n),l} - 1 - K_l \Omega_{x(n),l}}{\Omega_{x(n),l}(\Phi_{n,x(n),l} - 1)(1 + K_l)} \tag{16}$$

$$\rho^*_{n,x(n),l} = \begin{cases} 1, \rho_{tmp,n,x(n),l} > 1 \\ \rho_{tmp,n,x(n),l}, 0 \leq \rho_{tmp,n,x(n),l} \leq 1 \\ 0, \rho_{tmp,n,x(n),l} < 0 \end{cases}$$

$$\Phi_{n,x(n),l} = \frac{R_{n,x(n),l}}{R_{n,x(n)}} \tag{17}$$

$$\Omega_{x(n),l} = \frac{p_{x(n)}}{K_l p_l}$$

Figure 4:
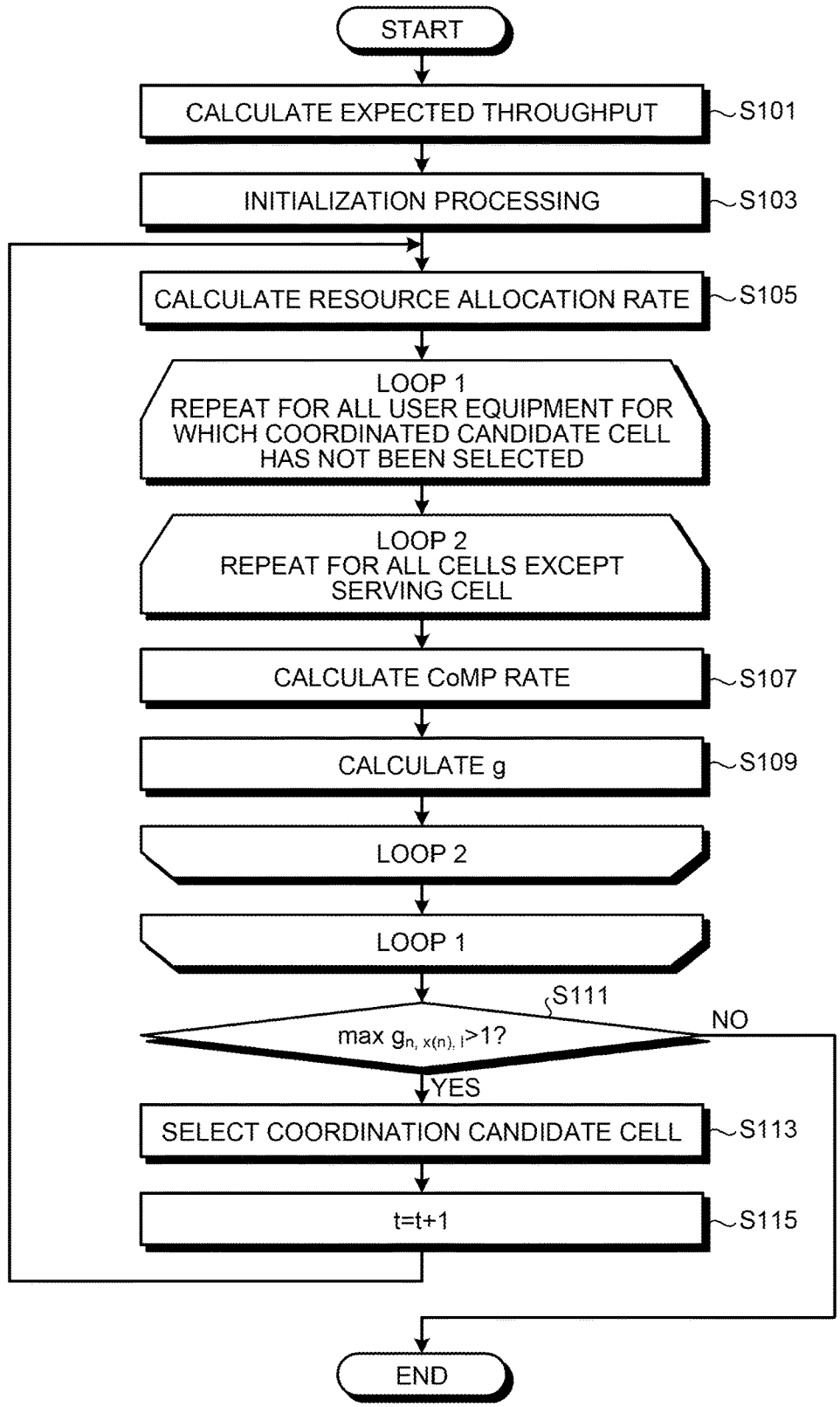
FIG. 4 is a flowchart indicating one example of selection processing of a coordination candidate cell performed by the base station of the first embodiment.

The selection processing of a coordination candidate cell of the first embodiment is explained below according to a flowchart. FIG. 4 is a flowchart indicating one example of the selection processing of a coordination candidate cell performed by the base station of the first embodiment.

In FIG. 4, first, the coordination candidate cell selecting unit 12 calculates the expected throughput $R_{n, x(n)}$ when the coordinated communication is not performed and the expected throughput $R_{n, x(n), l}$ when the coordinated communication is performed according to Equations (1) and (2) (step S101).

Subsequently, the coordination candidate cell selecting unit 12 initializes each variable according to Equation (18) (step S103).

$$\rho_{n,x(n),l}^{(0)} = 0$$

$$A_{ii} = K_i$$

$$t = 1 \tag{18}$$

Subsequently, the coordination candidate cell selecting unit 12 calculates the resource allocation rate according to Equation (19) (step S105).

$$A_{ii}^{(t)} = A_{ii} \tag{19}$$

$$A_{ij}^{(t)} = \sum_{z(j)} \rho_{z(j),i,j}^{(t-1)}, \; i \neq j$$

$$P^{(t)} = (A^{(t)})^{-1} 1$$

Subsequently, the coordination candidate cell selecting unit 12 repeats processing at steps S107 and S109 under conditions of loop 1 and loop 2. That is, the coordination candidate cell selecting unit 12 repeats the processing at steps S107 and S109 for all of the user equipment n for which a coordination candidate cell has not been selected (loop 1). Moreover, the coordination candidate cell selecting unit 12 the coordination candidate cell selecting unit 12 repeats the processing at steps S107 and S109 for all of the cells except the serving cell (loop 2).

At step S107, the coordination candidate cell selecting unit 12 calculates the CoMP rate $\rho_{tmp, n, x(n), l}$ that maximizes the increase-decrease rate a $g_{n, x(n), l}$ of the PF utility according to Equations (16) and (17). Furthermore, at step S109, the coordination candidate cell selecting unit 12 calculates the increase-decrease rate $g_{n, x(n), l}$ of the PF utility according to Equation (14).

Having finished the repeated processing in loop 1 and loop 2, the coordination candidate cell selecting unit 12 determines whether a maximum value of the increase-decrease rate $g_{n, x(n), l}$ of the PF utility is larger than 1 (step S111).

When the maximum value of $g_{n, x(n), l}$ is larger than 1 (step S111: YES), the coordination candidate cell selecting unit 12 selects a cell $\hat{l}$ as a coordination candidate cell for user equipment $\hat{n}$ for which $g_{n, x(n), l}$ is maximum according to Equation (20) (step S113). Moreover, after selecting the coordination candidate cell according to Equation (20), the coordination candidate cell selecting unit 12 performs update processing according to Equation (21) (step S113).

$$(\hat{n},\hat{l}) = \arg\max g_{n,x(n),l} \quad (20)$$

$$\rho_{\hat{n},x(\hat{n}),\hat{l}}^{(t)} = \rho_{\hat{n},x(\hat{n}),\hat{l}}^{*}$$

$$\rho_{n,x(n),l}^{(t)} = \rho_{n,x(n),l}^{(t-1)}, n \neq \hat{n}, l \neq \hat{l} \quad (21)$$

Subsequently, the coordination candidate cell selecting unit 12 increments t by 1 (step S115), and the processing returns to step S105.

On the other hand, when the maximum value of $g_{n, x(n), l}$ is equal to or smaller than 1 (step S111: NO), the selection processing of a coordination candidate cell is ended.

The condition of loop 2 in FIG. 4 may be set to "repeat for a cell having an RSRP a difference of which from the RSRP of the serving cell is equal to or smaller than a threshold". Moreover, "1" in the condition at step S111 may be a predetermined threshold other than 1. Furthermore, the selection processing of a coordination candidate cell may be ended when a predetermined number of coordination candidate cells have been selected.

[b] Second Embodiment

In the selection processing of a coordination candidate cell explained in the first embodiment, the maximum number of coordination candidate cells per user equipment is 1. On the other hand, in a second embodiment, selection processing when the maximum number of coordination candidate cells per user equipment is 2 or more.

Selection Processing of Coordination Candidate Cell

Figure 5:
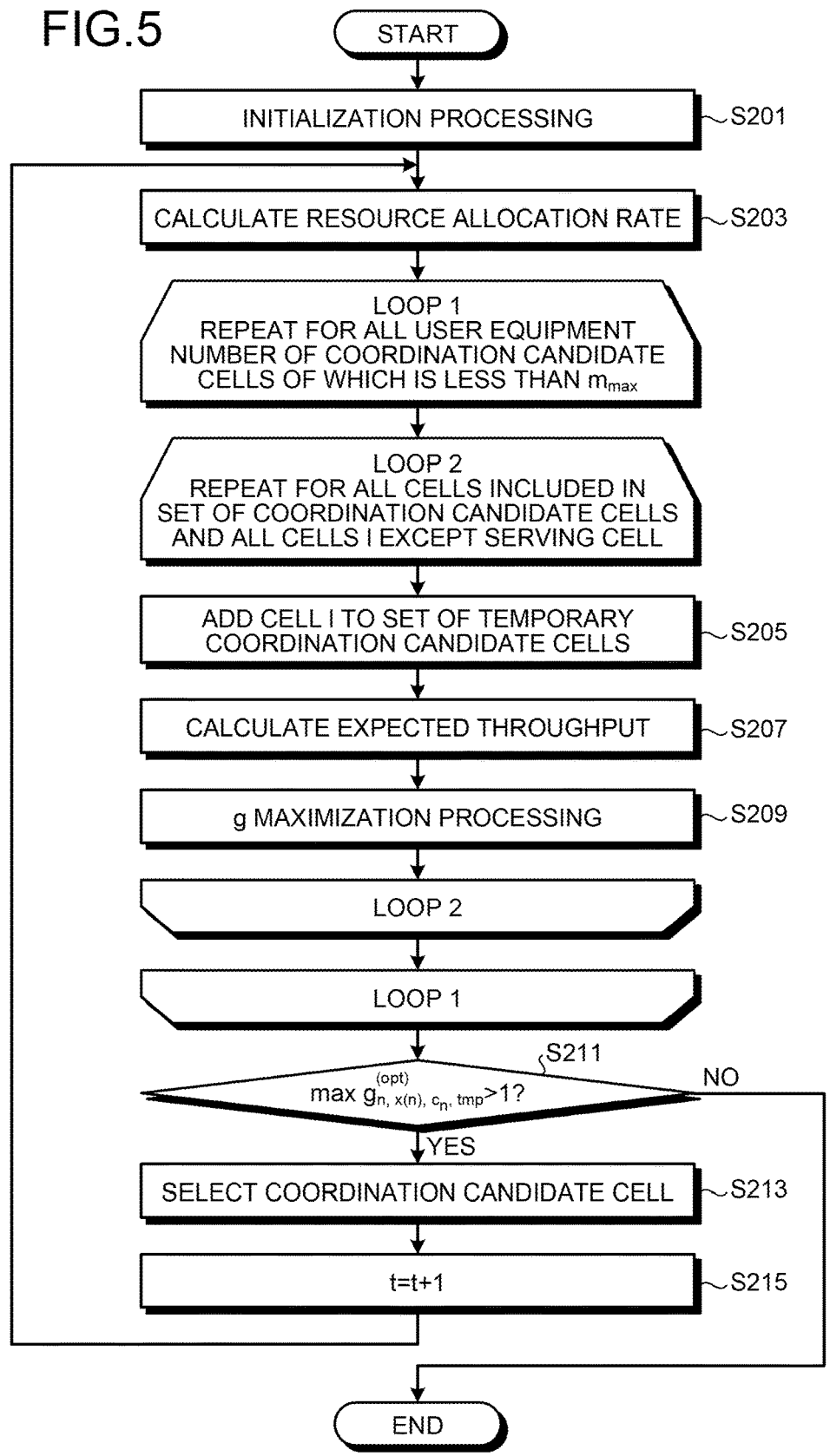
FIG. 5 is a flowchart indicating one example of selection processing of a coordination candidate cell performed by a base station of a second embodiment.

The selection processing of a coordination candidate cell of the second embodiment is explained below according to a flowchart. FIG. 5 is a flowchart indicating one example of the selection processing of a coordination candidate cell performed by a base station of the second embodiment.

In FIG. 5, first, the coordination candidate cell selecting unit 12 initializes each variable according to Equation (22) (step S201). $C_n^{(t)}$ in Equation (22) is a set of coordination candidate cells for the user equipment n at the time when the t-th repetition is finished. Moreover, $\phi$ indicates an empty set, X∪Y indicates a union of a set X and a set Y, and X\Y indicates a difference set of the set X and the set Y.

$$A_{ii} = K_i$$

$$t = 1$$

$$C_n^{(0)} = \phi$$

$$\rho_{n,x(n),\{C_n^{(0)} \cup \{1\}\}}^{(0)} = 0, 1 \in \{M\setminus\{x(n)\}\} \quad (22)$$

Subsequently, the coordination candidate cell selecting unit 12 calculates the resource allocation rate according to Equation (23) (step S203).

$$A_{ii}^{(t)} = A_{ii} \quad (23)$$

$$A_{ij}^{(t)} = \sum_{n \in N, j \in C_n^{(t-1)}} \rho_{n,x(n),C_n^{(t-1)}}^{(t-1)}, i \neq j$$

$$p^{(t)} = (A^{(t)})^{-1} 1$$

Subsequently, the coordination candidate cell selecting unit 12 repeats processing at steps S205, S207, and S209 under conditions of loop 1 and loop 2. That is, the coordination candidate cell selecting unit 12 repeats the processing at steps S205, S207, and S209 according to a condition indicated in Equation (24) for all of the user equipment n in which the number of coordination candidate cells currently been selected is less than a predetermined maximum number $m_{max}$ of coordination candidate cells (loop 1). Note that $m_{max}$ is a predetermined positive integer equal to or larger than 2. Furthermore, the coordination candidate cell selecting unit 12 repeats the processing at steps S205, S207, and S209 according to a condition indicated in Equation (25) for cells included in a set $C_n^{(t)}$ of coordination candidate cells and all of cells 1 except the serving cell (loop 2).

$$n \in N, |C_n^{(t-1)}| < m_{max} \quad (24)$$

$$1 \in \{M\setminus(\{x(n)\} \cup C_n^{(t-1)})\} \quad (25)$$

At step S205, the coordination candidate cell selecting unit 12 adds the cell l to a set $C_{n, tmp}$ of temporary coordination candidate cells as indicated in Equation (26).

$$C_{n,tmp} = \{C_n^{(t-1)} \cup 1\} \quad (26)$$

An entire set of combinations of cells that are extracted from the set $C_{n, tmp}$ of the temporary coordination candidate cells as many as 0 to $|C_{n, tmp}|$ is $Q(C_{n, tmp})$. For example, when $C_{n, tmp} = \{1, 2, 3\}$, $Q(C_{n, tmp}) = \{\{\phi\}, \{1\}, \{2\}, \{3\}, \{1, 2\}, \{1, 3\}, \{2, 3\}, \{1, 2, 3\}\}$. For this $Q(C_{n, tmp})$, elements of $\{1\}, \{2\}, \{3\}, \{1, 2\}, \{1, 3\}, \{2, 3\}$ are also called a "subset" in some cases.

Therefore, the coordination candidate cell selecting unit 12 calculates an expected throughput for each element q of $Q(C_{n, tmp})$ according to Equation (27) (step S207).

$$R_{n,x(n),l,q} = W\log\left(1 + \frac{SNR_{n,x(n),q}}{\alpha}\right) \quad (27)$$

$$SNR_{n,x(n),q} = \frac{P_{n,x(n)}}{N_{th} + \sum_{i \in M, i \notin \{q \cup x(n)\}} P_{n,i}} : \text{muting}$$

-continued $$SNR_{n,x(n),q} = \frac{\sum_{i \in \{q \cup x(n)\}} P_{n,i}}{N_{th} + \sum_{i \in M, i \notin \{q \cup x(n)\}} P_{n,i}} : \text{non-coherent} JT$$

$$SNR_{n,x(n),q} = \frac{\left(\sum_{i \in \{q \cup x(n)\}} \sqrt{P_{n,i}}\right)^2}{N_{th} + \sum_{i \in M, i \notin \{q \cup x(n)\}} P_{n,i}} : \text{coherent} JT$$

An estimated throughput at the time when the t−1-th repetition is finished is expressed by Equation (28). Moreover, an increase rate of an estimated throughput is expressed by Equation (29) by using the estimated throughput indicated in Equation (28). Note that a condition indicated in Equation (30) is satisfied.

$$T_{n,x(n)}^{(t-1)} = p_{n,x(n)} \sum_{q \in Q(C_n^{(t-1)})} \rho_{n,x(n),q} R_{n,x(n),q} SNR_{n,x(n),q} \quad (28)$$

$$\frac{p_{n,x(n)} \sum_{q \in Q(C_{n,tmp})} \rho_{n,x(n),q} R_{n,x(n),q}}{T_{n,x(n)}^{(t-1)}} \quad (29)$$

$$\sum_{q \in Q(C_{n,tmp})} \rho_{n,x(n),q} = 1 \quad (30)$$

On the other hand, a decrease rate of an estimated throughput of the user equipment n that uses a cell from which a resource is taken away as the serving cell is expressed by Equation (31).

$$\prod_{c \in C_{n,temp}} \left( \frac{K_c p_c - p_{x(n)}(\rho_{n,x(n),c} - \rho_{n,x(n),c}^{(t-1)})}{K_c p_c} \right)^{K_c} \quad (31)$$

Therefore, an increase-decrease rate $g_{n, x(n), Cn, tmp}$ of the PF utility as a result of performing the coordinated communication is expressed, as indicated in Equation (32), by a product of the increase rate (Equation (29)) of an estimated throughput of each of the user equipment n and the decrease rate (Equation (31)) of an estimated throughput of each of the user equipment n.

$$g_{n,x(n),C_{n,temp}} = \frac{p_{n,x(n)} \sum_{q \in Q(C_{n,tmp})} \rho_{n,x(n),q} R_{n,x(n),q}}{T_{n,x(n)}^{(t-1)}} \prod_{c \in C_{n,temp}} \left( \frac{K_c p_c - p_{x(n)}(\rho_{n,x(n),c} - \rho_{n,x(n),c}^{(t-1)})}{K_c p_c} \right)^{K_c} \quad (32)$$

Therefore, the coordination candidate cell selecting unit 12 solves a maximization problem indicated in Equation (33) at step S209 (g maximization processing). To solve this problem corresponds to optimization of a conditional multivariable function, and the problems is solved, for example, by using a gradient method. In this example, a CoMP rate that gives the optimal solution of this problem is $\rho^{(opt)}_{n, x(n), q}$, and an increase-decrease rate of the PF utility that gives the optimal solution of this problem is $g^{(opt)}_{n, x(n), Cn, tmp}$.

$$\text{Maximize } g_{n,x(n),C_{n,temp}} \text{ subject to } \sum_{q \in Q(C_{n,temp})} \rho_{n,x(n),q} = 1 \quad (33)$$

Having finished the repeated processing in loop 1 and loop 2, the coordination candidate cell selecting unit 12 determines whether a maximum value of the increase-decrease rate $g^{(opt)}_{n, x(n), Cn, tmp}$ of the PF utility is larger than 1 (step S211).

When the maximum value of $g^{(opt)}_{n, x(n), Cn, tmp}$ is larger than 1 (step S211: YES), the coordination candidate cell selecting unit 12 selects a coordination candidate cell by selecting a set $\hat{C}_{n, tmp}$ of temporary coordination candidate cells as a new set of coordination candidate cells for the user equipment $\hat{n}$ in which $g^{(opt)}_{n, x(n), Cn, tmp}$ is maximum according to Equations (34) and (35) (step S213). Moreover, after performing the selection of the coordination candidate cell according to Equations (34) and (35), the coordination candidate cell selecting unit 12 update processing indicated in Equation (36) (step S213).

$$(\hat{n}, \hat{C}_{\hat{n},tmp}) = \arg \max g_{n,x(n),C_{n,tmp}}^{(opt)} \quad (34)$$

$$C_{\hat{n}}^{(t)} = \hat{C}_{\hat{n},tmp} \quad (35)$$

$$C_n^{(t)} = C_n^{(t-1)}, n \neq \hat{n}$$

$$\rho_{\hat{n},x(\hat{n}),C_{\hat{n}}^{(t)}} = \rho_{\hat{n},x(\hat{n}),\hat{C}_{\hat{n},tmp}}^{(opt)}$$

$$\rho_{n,x(n),C_n^{(t)}} = \rho_{n,x(n),C_n^{(t-1)}}, n \neq \hat{n}, l \neq \hat{l} \quad (36)$$

Subsequently, the coordination candidate cell selecting unit 12 increments t by 1 (step S215), and the processing returns to step S203.

On the other hand, when the maximum value of $g^{(opt)}_{n, x(n), Cn, tmp}$ is equal to or smaller than 1 (step S211: NO), the selection processing of a coordination candidate cell is ended.

[c] Third Embodiment

In the selection processing of a coordination candidate cell explained in the second embodiment, optimization of the multivariable function is performed when the maximum number of coordination candidate cells per user equipment is 2 or more. On the other hand, in a third embodiment, selection processing in which the optimization of a multivariable function in the second embodiment is simplified to optimization of a single-variable function is explained. To simplify the optimization of a multivariable function to the optimization of a single-variable function, in the third embodiment, only when a serving cell and all cells except the serving cell coordinate with each other, that is, such a constraint that coordinated communication by a subset is not performed is set. For example, for $Q(C_{n, tmp}) = \{\{\phi\}, \{1\}, \{2\}, \{3\}, \{1, 2\}, \{1, 3\}, \{2, 3\}, \{1, 2, 3\}\}$ described above, a constraint that only communication with the serving cell alone, and the coordinated communication with a combination of the serving cell and {1, 2, 3} are performed, and coordinated communication with a combination of {1}, {2}, {3}, {1, 2}, {1, 3}, {2, 3}, which are a subset, is not performed is set.

Selection Processing of Coordination Candidate Cell

Figure 6:
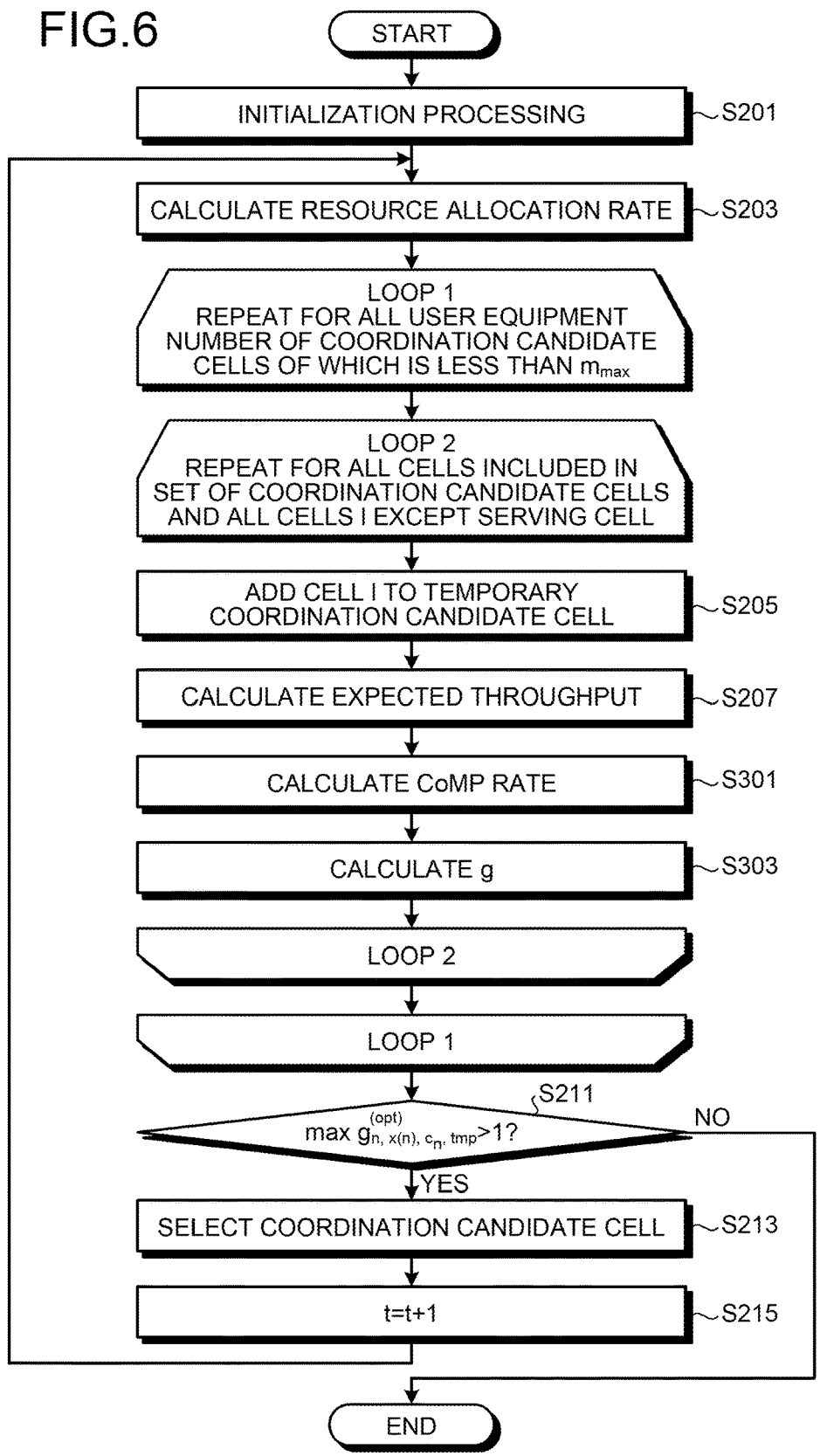
FIG. 6 is a flowchart indicating one example of selection processing of a coordination candidate cell performed by a base station of a third embodiment.

Selection processing of a coordination candidate cell of the third embodiment is explained below according to a flowchart. FIG. 6 is a flowchart indicating one example of the selection processing of a coordination candidate cell performed by a base station of the third embodiment.

Because processing at steps S201, S203, S205, S207, S211, S213, and S215 in FIG. 6 are the same that of the second embodiment (FIG. 5), explanation thereof is omitted.

The coordination candidate cell selecting unit 12 repeats the processing at steps S205, S207, S301, and S303 under conditions of loop 1 and loop 2. That is, the coordination candidate cell selecting unit 12 repeats the processing at steps S205, S207, S301, and S303 for all of the user equipment n in which the number of coordination candidate cells currently been selected is less than the predetermined maximum number $m_{max}$ of coordination candidate cells according to the condition indicated in Equation (24) (loop 1). Moreover, the coordination candidate cell selecting unit 12 repeats the processing at steps S205, S207, S301, and S303 for cells included in a set $C_n^{(t-1)}$ of coordination candidate cells and all cells except the serving cell according to the condition indicated in Equation (25) (loop 2).

When the constraint that the coordinated communication with a subset is not performed is set, an increase rate of an estimated throughput is expressed by Equation (37) by using the estimated throughput indicated in Equation (28).

$$\frac{p_{n,x(n)}\{(1-\rho_{n,x(n),C_{n,tmp}})R_{n,x(n)} + \rho_{n,x(n)}P_{n,x(n),C_{n,temp}}\}}{T_{n,x(n)}^{(t-1)}} = \quad (37)$$

$$(1-\rho_{n,x(n),C_{n,tmp}})\Phi_1 + \rho_{n,x(n),C_{n,tmp}}\Phi_2$$

$$\Phi_1 = \frac{p_{n,x(n)}R_{n,x(n)}}{T_{n,x(n)}^{(t-1)}}, \quad \Phi_2 = \frac{p_{n,x(n)}R_{n,x(n)}, C_{n,tmp}}{T_{n,x(n)}^{(t-1)}}$$

Therefore, an increase-decrease rate $g_{n, x(n), C_n, tmp}$ of the PF utility as a result of performing the coordinated communication is expressed by Equation (38).

$$g_{n,x(n),C_{n,temp}} = \{(1-\rho_{n,x(n),C_{n,tmp}})\Phi_1 + \rho_{n,x(n),C_{n,tmp}}\Phi_2\} \quad (38)$$

$$(1-\Omega\rho_{n,x(n),C_{n,tmp}})^{K_{C_{n,tmp}\backslash C_n^{(t-1)}}}$$

$$\Omega = \frac{p_{x(n)}}{K_{C_{n,tmp}\backslash C_n^{(t-1)}} p_{C_{n,tmp}\backslash C_n^{(t-1)}}}$$

Moreover, a CoMP rate $\rho_{tmp, n, x(n), C_n, temp}$ that maximizes $g_{n, x(n), C_n, tmp}$ is given by Equation (39).

$$\rho_{tmp,n,x(n),C_{n,tmp}} = \frac{\Phi_2 - \Phi_1 - K_{C_{n,tmp}\backslash C_n^{(t-1)}}\Omega\Phi_1}{\Omega(\Phi_2-\Phi_1)(1+K_{C_{n,tmp}\backslash C_n^{(t-1)}})} \quad (39)$$

$$\rho^*_{n,x(n),C_{n,tmp}} = \begin{cases} 1, & \rho_{tmp,n,x(n),C_{n,tmp}} > 1 \\ \rho_{tmp,n,x(n),C_{n,tmp}}, & 0 \le \rho_{tmp,n,x(n),C_{n,tmp}} \le 1 \\ 0, & \rho_{tmp,n,x(n),C_{n,tmp}} < 0 \end{cases}$$

Therefore, the coordination candidate cell selecting unit 12 calculates the CoMP rate $\rho_{tmp, n, x(n), C_n, temp}$ that maximizes the increase-decrease rate $g_{n, x(n), C_n, tmp}$ of the PF utility according to Equation (39) (step S301). Furthermore, the coordination candidate cell selecting unit 12 calculates the increase-decrease rate $g_{n, x(n), C_n, tmp}$ of the PF utility according to Equation (38) by using $\rho^*_{n, x(n), C_n, tmp}$ indicated in Equation (39) (step S303).

[d] Fourth Embodiment

Selection Processing of Coordination Candidate Cell

Figure 7:
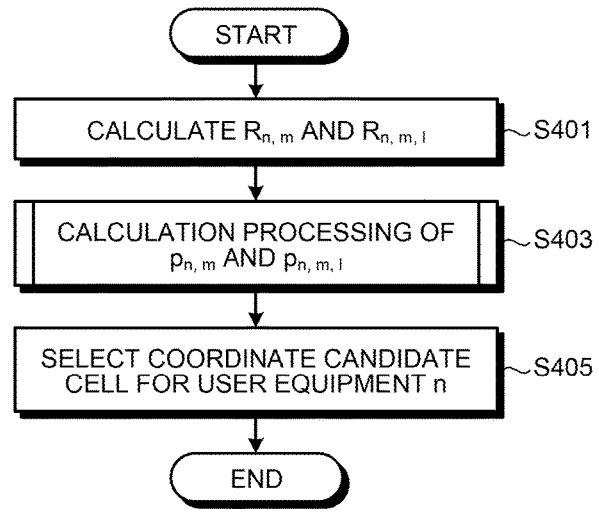
FIG. 7 is a flowchart indicating one example of selection processing of a coordination candidate cell performed by a base station of a fourth embodiment.
Figure 8:
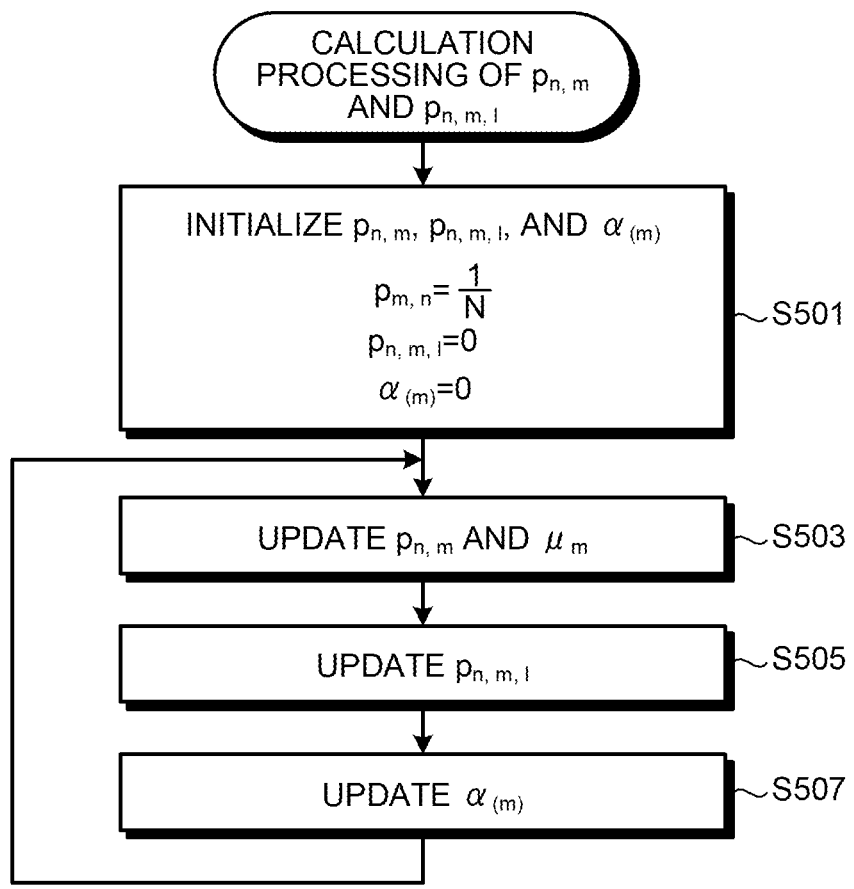
FIG. 8 is a flowchart indicating one example of selection processing of a coordination candidate cell performed by a base station of the fourth embodiment.

Selection processing of a coordination candidate cell of a fourth embodiment is explained below according to a flowchart. FIG. 7 and FIG. 8 are flowcharts indicating one example of the selection processing of a coordination candidate cell performed by a base station of the fourth embodiment.

In FIG. 7, first, the coordination candidate cell selecting unit 12 calculates an expected throughput $R_{n, m}$ in the cell m in which the coordinated communication is not performed, and an expected throughput $R_{n, m, l}$ when the coordinated communication is performed between the cell m and the cell l for the user equipment n according to Equations (40) and (41) (step S401). In Equations (40) and (41), $P_{n, j}$ indicates an RSRP of the cell j that is informed by the user equipment n, and $P_{n, m}$ indicates an RSRP of the cell m informed by the user equipment n, and $P_{n, l}$ indicates an RSRP of the cell l informed by the user equipment n. Furthermore, $N_{th}$ indicates an interference noise power that includes an interference to the user equipment n and a thermal noise of the user equipment n. Moreover, W indicates a bandwidth of a data signal, and α is a coefficient expressing deterioration from the Shannon's theorem. As α, for example, 2.0 is set.

$$R_{n,m} = W\log\left(1 + \frac{SNR_{n,m}}{\alpha}\right) \quad (40)$$

$$SNR_{n,m} = \frac{P_{n,m}}{N_{th} + \sum_{j \notin m} P_{n,j}}$$

$$R_{n,m,l} = W\log\left(1 + \frac{SNR_{n,m,l}}{\alpha}\right) \quad (41)$$

$$SNR_{n,m,l} = \frac{P_{n,m} + P_{n,l}}{N_{th} + \sum_{j \notin m} P_{n,j}} : \text{non-coherent} JT$$

$$SNR_{n,m,l} = \frac{\left(\sqrt{P_{n,m}} \sqrt{P_{n,l}}\right)^2}{N_{th} + \sum_{j \neq m,l} P_{n,j}} : \text{coherent} JT$$

Subsequently, the coordination candidate cell selecting unit 12 calculates a resource allocation rate $p_{n, m}$ when communication is performed only with the cell m and the coordinated communication is not performed, and a resource allocation rate $p_{n, m, l}$ when the coordinated communication is performed between the cell m and the cell l for the user equipment n (step S403). Calculation of $p_{n, m}$ and $p_{n, m, l}$ is performed according to the flowchart in FIG. 8.

That is, in FIG. 8, first, the coordination candidate cell selecting unit 12 initializes respective variables according to Equation (42) (step S501). N in Equation (42) indicates the number of all user equipment.

$$P_{n,m} = 1/N$$

$$P_{n,m,l} = 0$$

$$\alpha(m) = 0 \quad (42)$$

$p_{n, m}$ and $p_{n, m, l}$ are calculated as in Equations (44) and (45) by solving a maximization problem of the PF utility expressed by Equation (43).

Maximize (43)

$$U = \frac{1}{N} \sum_{n \in UE} \log \left\{ \sum_{m \in eNB(n)} R_{n,m} p_{n,m} + \sum_{\substack{m,l \in eNB(n) \\ m \neq l}} R_{n,m,l} p_{n,m,l} \right\}$$

subject to $$\sum_{n \in UE(m)} p_{n,m} = 1 - \alpha(m)$$

$$\sum_{\substack{n \in UE(m,l) \\ l \in eNB(n)}} p_{n,m,l} = \alpha(m)$$

$$P_{n,m} = \max\left(0, \frac{1}{\mu_m} - \frac{T'_{n,m}}{R_{n,m}}\right), \quad (44)$$

$$T'_{n,m} = \sum_{\substack{j \in eNB(n) \\ j \neq m}} R_{n,j} p_{n,j} + \sum_{\substack{j,k \in eNB(n) \\ j \neq k}} R_{n,j,k} p_{n,j,k}$$

$$P_{n,m,l} = \max\left(0, \frac{1}{\mu_m + \mu_l} - \frac{T'_{n,m,l}}{R_{n,m,l}}\right), \quad (45)$$

$$T'_{n,m,l} = \sum_{j \in eNB(n)} R_{n,j} p_{n,j} + \sum_{\substack{j,k \in eNB(n) \\ j \neq k \\ k \neq l}} R_{n,j,k} p_{n,j,k}$$

$$m, l \in eNB(n)$$

In Equations (43) to (45), eNB indicates a set of all cells that are formed by the base station, UE indicates a set of all of the user equipment, eNB (n) indicates a set of coordination candidate cells for the user equipment n, and UE(m) indicates a set of the user equipment in which the cell m is included in the coordination candidate cells. Moreover, UE(m, l) indicates a set of the user equipment in which the cell m and the cell l are included in the coordination candidate cells, and α(m) indicates a rate for which the coordinated communication is performed by the cell m. It is preferable that cells included in the set eNB(n) of coordination candidate cells for the user equipment n be, for example, cells that have a possibility of communicating with the use equipment n, and all cells for which an RSRP can be estimated in the user equipment n. Alternatively, a cell included in the set eNB(n) of coordination candidate cells for the user equipment n may be, for example, cells within a predetermined number from top in RSRP in the user equipment n.

Therefore, the coordination candidate cell selecting unit 12 updates $p_{n,m}$ and $\mu_m$ by applying a water filling principle to "$\Sigma p_{n,m}=1-\alpha(m)$" in Equation (43) and Equation (44) (step S503).

Subsequently, the coordination candidate cell selecting unit 12 updates $p_{n,m,l}$ according to Equation (45) (step S505).

Subsequently, the coordination candidate cell selecting unit 12 updates α(m) according to "$\Sigma p_{n,m,l}=\alpha(m)$" in Equation (43) (step S507). After the processing at step S507, the processing returns to step S503.

$p_{n,m}$ and $p_{n,m,l}$ are calculated by repeating the processing at steps S503 to S507 for the predetermined number of times (step S403).

Referring back to FIG. 7, after the processing at step S403, the coordination candidate cell selecting unit 12 selects a coordination candidate cell for the user equipment n based on the $p_{n,m}$ and $p_{n,m,l}$ that are calculated at step S403 (step S405).

For example, the coordination candidate cell selecting unit 12 extracts $p_{n,m'}$ or $p_{n,m',l'}$ that indicates the maximum values from among $p_{n,m}$ and $p_{n,m,l}$ sequentially calculated according to the flowchart in FIG. 8. When $p_{n,m'}$ indicates the maximum value, the coordination candidate cell selecting unit 12 allow communication only with the cell m' for the user equipment n without selecting a coordination candidate cell, and when $p_{n,m',l'}$ indicates the maximum value, select the cell m' and the cell l' are the coordination candidate cells for the user equipment n.

Moreover, for example, the coordination candidate cell selecting unit 12 extracts $p_{n,m}$ and $p_{n,m,l}$ that are equal to or larger than a threshold $Th_{CoMP}$ from among $p_{n,m}$ and $p_{n,m,l}$ sequentially calculated according to the flowchart in FIG. 8, and selects a coordination candidate cell according to Equation (46).

$$\{m|m \in eNB(n), P_{n,m} > Th_{CoMP}\} \cup \{m,l \in eNB(n)|P_{n,m,l} > Th_{CoMP}\} \quad (46)$$

As described above, in the first embodiment and the fourth embodiment, the base station 2 in the communication system 1 that is capable of performing communication with multiple cells in coordination with each other includes the wireless reception unit 22 and the coordination candidate cell selecting unit 12. The wireless reception unit 22 receives a report of an RSRP from the user equipment. The coordination candidate cell selecting unit 12 calculates an expected throughput (first expected throughput) when the coordinated communication is not performed and an expected throughput (second expected throughput) when the coordinated communication is performed by using the RSRP. The coordination candidate cell selecting unit 12 then selects a coordination candidate cell based on the first expected throughput, the second expected throughput, a resource allocation rate (first resource allocation rate) when the coordinated communication is not performed, and a resource allocation rate (second resource allocation rate) when the coordinated communication is performed.

For example, in the first embodiment, the coordination candidate cell selecting unit 12 calculates an increase rate of a throughput when the coordinated communication is performed based on the first expected throughput, the second expected throughput, the first resource allocation rate, and the second resource allocation rate. Furthermore, the coordination candidate cell selecting unit 12 calculates a decrease rate of a throughput in the user equipment that uses a cell a resource of which decreases by performing the coordinated communication as a serving cell, by using the first expected throughput, the second expected throughput, the first resource allocation rate, and the second resource allocation rate. Subsequently, a coordination candidate cell is selected so that a product of the increase rate of a throughput and the decrease rate of a throughput is larger than 1.

Thus, a cell that increase the PF utility of the entire communication system can be selected as a coordination candidate cell in the coordinated communication, and therefore, an optimal coordination candidate cell can be selected.

Moreover, in the first embodiment, the coordination candidate cell selecting unit 12 selects a coordination candidate cell, setting the maximum number of coordination candidate cells per user equipment to 1.

This enables to reduce the amount of processing related to selection of a coordination candidate cell.

Moreover, in the second embodiment, the coordination candidate cell selecting unit 12 selects a coordination candidate cell, setting the maximum number of coordination candidate cells per user equipment to 2 or more.

This makes it possible to form various combinations of coordination candidate cells, and therefore, a combination of coordination candidate cells with which the PF metric is maximized can be changed whenever scheduling of each sub-frame that is performed in a short period. Therefore, optimal scheduling can be performed.

Furthermore, in the third embodiment, the coordination candidate cell selecting unit 12 selects a coordination candidate cell under the constraint that the coordinated communication is performed only when a serving cell and all of cells except the serving cell coordinate with each other.

This enables to suppress the increase of the amount of processing related to selection of a coordination candidate cell even when the maximum number of coordination candidate cells per user equipment is 2 or more.

[e] Other Embodiment

Figure 9:
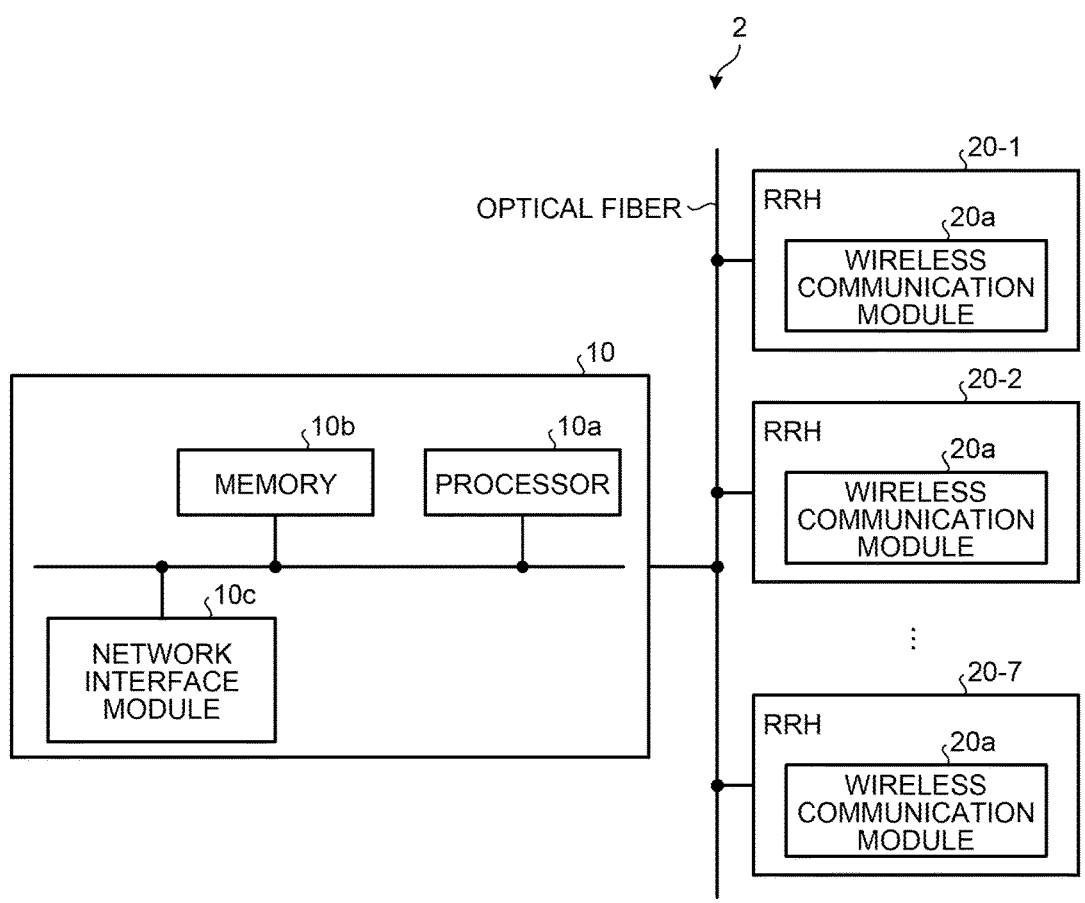
FIG. 9 depicts a hardware configuration example of a base station.

[1] The base station 2 can be implemented by a hardware configuration as follows. FIG. 9 depicts a hardware configuration example of the base station. As depicted in FIG. 9, the base station 2 includes a processor 10*a*, a memory 10*b*, and a network interface module 10*c* in the centralized control station 10 as components of the hardware, and includes a wireless communication module 20*a* in the RRH 20. As one example of the processor 10*a*, a central processing unit (CPU), a digital signal processor (DSP), a field programmable gate array (FPGA), and the like can be considered. Furthermore, the base station 2 may include, in the centralized control station 10, a large-scale integrate circuit (LSI) that includes the processor 10*a* and a peripheral circuit. As an example of the memory 10*b*, a random access memory (RAM) such as a synchronous dynamic random access memory (SDRAM), a read-only memory (ROM), a flash memory, and the like can be considered.

The baseband processing unit 11, the coordination candidate cell selecting unit 12, and the scheduling unit 13 are implemented by the processor 10*a*. The wireless transmission unit 21, the wireless reception unit 22, the transmission antenna A1, and the reception antenna A2 are implemented by the wireless communication module 20*a*.

Figure 10:
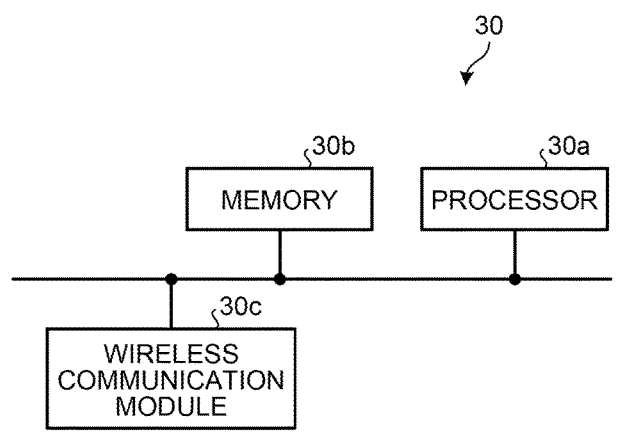
FIG. 10 depicts hardware configuration example of user equipment.

[2] The user equipment 30 is implemented by a hardware configuration as follows. FIG. 10 depicts a hardware configuration example of user equipment. As depicted in FIG. 10, the user equipment 30 includes a processor 30*a*, a memory 30*b*, and a wireless communication module 30*c* as hardware components. As an example of the processor 30*a*, a CPU, a DSP, an FPGA, and the like can be considered. Moreover, the user equipment 30 may include an LSI that includes the processor 30*a* and a peripheral circuit. As an example of the memory 30*b*, a RAM such as an SDRAM, a ROM, a flash memory, and the like can be considered.

The reception antenna 301, the transmission antenna 313, the wireless reception unit 302, and the wireless transmission unit 312 are implemented by the wireless communication module 30*c*. The CP removing unit 303, the FFT unit 304, the separating unit 305, the demodulation control unit 306, the demodulating unit 307, the decoding unit 308, the CSI estimating unit 309, the RSRP estimating unit 310, and the transmission processing unit 311 are implemented by the processor 30*a*.

According to a disclosed embodiment, an optimal coordination candidate cell can be selected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station in a communication system in which a plurality of cells are capable of performing communication in coordination with each other, the base station comprising:
    a receiving unit that receives information of a reception power from a user equipment; and
    a selecting unit that
        calculates a first throughput and a second throughput by using the information of the reception power, the first throughput being a throughput when coordinated communication is not performed and a single user equipment occupies an entire band, the second throughput being a throughput when the coordinated communication is performed and the single user equipment occupies the entire band, and
        selects a coordination candidate cell based on the first throughput, the second throughput, a first resource allocation rate and a second resource allocation rate, the first resource allocation rate being a resource allocation rate when the coordinated communication is not performed, the second resource allocation rate being a resource allocation rate when the coordinated communication is performed.

2. The base station according to claim 1, wherein
    the selecting unit
        calculates, by using the first throughput, the second throughput, the first resource allocation rate and the second resource allocation rate, an increase rate of a throughput when the coordinated communication is performed and a decrease rate of a throughput in a user equipment that uses a cell a resource of which decreases by performing the coordinated communication as a serving cell, and
        selects the coordination candidate cell so that a product of the increase rate and the decrease rate is larger than 1.

3. The base station according to claim 2, wherein the selecting unit selects the coordination candidate cell by setting a maximum number of coordination candidate cells per user equipment to 1.

4. The base station according to claim 2, wherein the selecting unit selects the coordination candidate cell by setting a maximum number of coordination candidate cells per user equipment to 2 or more.

5. The base station according to claim 4, wherein the selecting unit selects the coordination candidate cell under a constraint that the coordinated communication is performed is only when a serving cell and all cells except the serving cell coordinate with each other.

6. A cell selection method in a communication system in which a plurality of cells are capable of performing communication in coordination with each other, the cell selection method comprising:
    calculating a first throughput and a second throughput by using information of a reception power in a user equipment, the first throughput being a throughput when coordinated communication is not performed and a single user equipment occupies an entire band, the second throughput being a throughput when the coordinated communication is performed and the signal user equipment occupies the entire band; and selecting a coordination candidate cell based on the first throughput, the second throughput, a first resource allocation rate and a second resource allocation rate, the first resource allocation rate being a resource allocation rate when the coordinated communication is not performed, the second resource allocation rate being a resource allocation rate when the coordinated communication is performed.

* * * * *